No. 816,442. PATENTED MAR. 27, 1906.
W. L. R. EMMET.
SYSTEM OF ELECTRICAL REGULATION
APPLICATION FILED JULY 1, 1904.
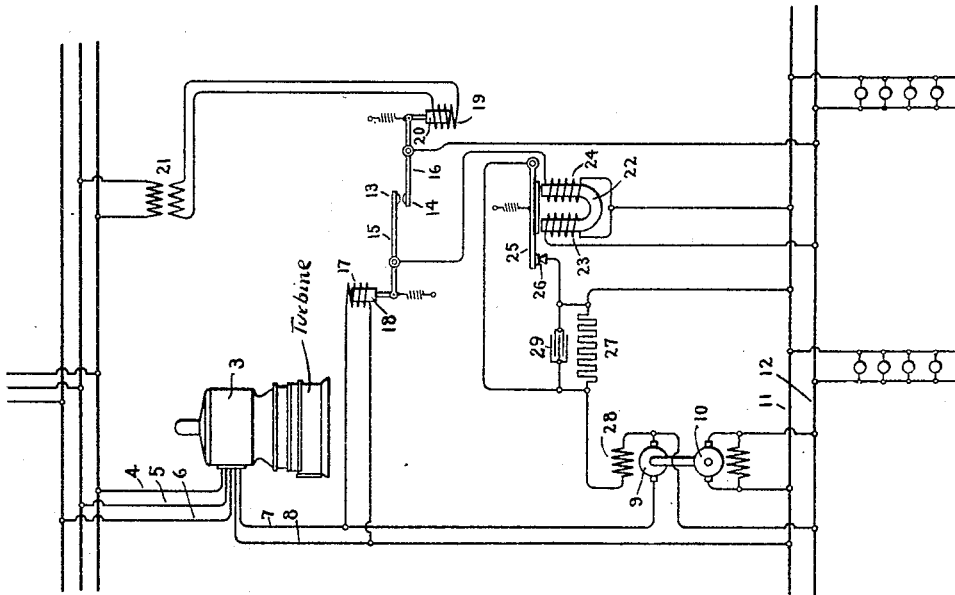
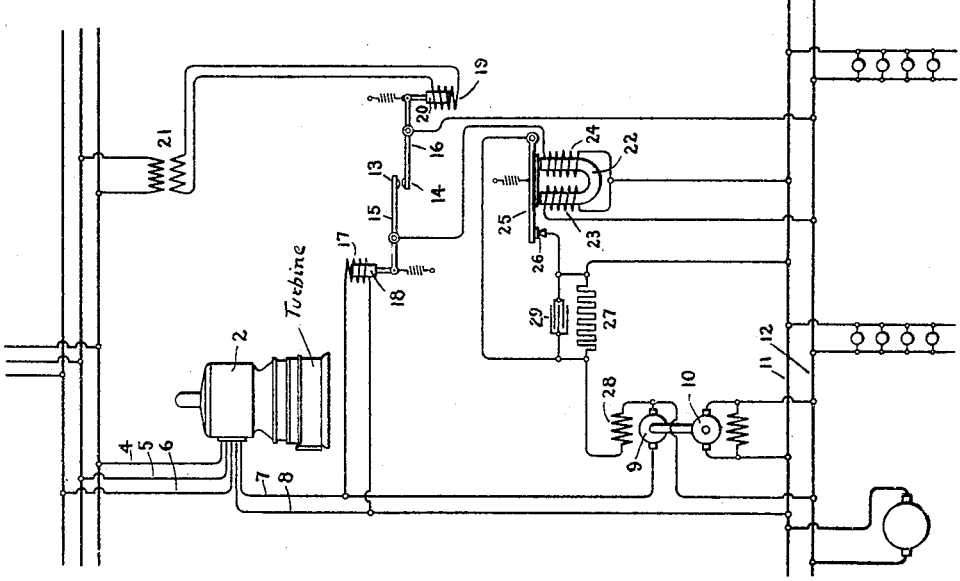
Witnesses
J. Ellis Glen.
Helen Orford
Inventor:
William L. R. Emmet
by Albert G. Davis
Atty.

UNITED STATES PATENT OFFICE.

WILLIAM L. R. EMMET, OF SCHENECTADY, NEW YORK, ASSIGNOR TO GENERAL ELECTRIC COMPANY, A CORPORATION OF NEW YORK

SYSTEM OF ELECTRICAL REGULATION.

No. 816,442. Specification of Letters Patent. Patented March 27, 1906.

Application filed July 1, 1904. Serial No. 214,878.

*To all whom it may concern:*

Be it known that I, WILLIAM L. R. EMMET, a citizen of the United States, residing at Schenectady, county of Schenectady, State of New York, have invented certain new and useful Improvements in Systems of Electrical Regulation, of which the following is a specification.

In many cases, particularly in plants where water or steam turbines are installed, it is desirable to operate large exciter units which will supply exciting-current for the whole station and which will also operate certain auxiliaries, such as the oil-pumps, electrical governors on the turbines, and the like. Under these circumstances it is not desirable to regulate the turbine-driven generators by regulating the voltage of the exciter, since the changes in voltage required of the exciter might objectionably affect the other apparatus supplied by the exciter. To overcome these difficulties and at the same time to permit the use of a single exciting source, I interpose a booster between the exciting source and the generator to be regulated and vary the voltage of this booster by means of a suitable regulator, so as to obtain the desired voltage or current at the generator. The regulator which I employ for controlling the booster is that commonly known in the art as the "Tirrill" regulator, described in United States Patent No. 726,234, though variations thereof may be employed, if desired.

The novel features which characterize my invention are pointed out with particularity in the appended claims. The invention itself, however, will be better understood by reference to the following description, taken in connection with the accompanying drawing, which represents diagrammatically one embodiment of my invention.

Referring to the drawing, 1 indicates a source of exciting-current for supplying any desired number of translating devices at the station. This source may be a single large exciter or it may be any other suitable source of direct current—such, for example, as the ordinary electric-light-supply mains.

The exciting source 1 may supply exciting-current to a number of generators. By way of example I have represented two such generators at 2 and 3. These are of the well-known turbine-driven type in which the alternating-current generator is coupled directly to the rotary member of the turbine and the whole mounted so as to form a unitary structure. In the case of generator 2 the alternating-current-supply mains leading therefrom are indicated at 4, 5, and 6. The leads for the field exciting-current are indicated at 7 and 8. Since the exciter 1 is driven so as to have ordinarily a constant voltage, I provide for regulating the voltage or current supplied to the field of the machine 2 by making use of a boosting set consisting of a generator 9 in series, for example, with the leads 7, which generator is mechanically driven by an electric motor 10, receiving its power from the exciter bus-bars or mains 11 and 12. It is to be understood that where I use the term "booster" I imply that the voltage of the so-called "booster" may be utilized either to assist or to cut down the voltage of the exciting source, as the case may be. In other words, there may be either a positive or a negative boosting action.

To control the booster in response to the requirements of the generator 2, I make use of a suitable regulator—such, for example, as the now well-known Tirrill regulator. Such a regulator I have indicated somewhat diagrammatically in the drawing. The portions of the regulator responsive to voltage consist of two floating contacts 13 and 14, each carried by pivoted lever-arms 15 and 16, respectively. Each lever-arm is controlled by a solenoid and core. The solenoid 17, which operates upon the core 18, connected with the lever 15, receives the voltage at the terminals of the field exciting-circuit of the machine 2. The solenoid 19, which acts upon the core 20, connected to the lever-arm 16, receives, as by means of a small transformer 21, a voltage proportional to that developed on the alternating-current side of the generator 2.

The contacts 13 and 14 when they come together or separate serve to control a differentially-wound relay-magnet 22. This magnet has two windings 23 and 24, of which the winding 23 is connected across some source of current, such as the bus-bars 11 and 12, while the other winding 24 is adapted to have its circuit closed by the contacts 13 and 14 across the same source. Thus when the contacts 13 and 14 are closed the two windings neutralize each other, while when the contacts are open the winding 23, being no longer opposed by its companion winding, then becomes effective.

When the magnet 22 becomes magnetized in the manner described, it draws down its armature 25 and completes the circuit by contacts 26 about a regulating resistance 27 in series with the field-windings 28 of the booster 9. Upon the demagnetization of the magnet 22 the contacts 26, which are shunted by a condenser 29 to reduce sparking, are opened and the resistance 27 inserted in circuit. This resistance is so large that it tends to produce an excessive change of voltage. The contacts therefore keep up a rapid opening and closing, so that the resistance, being in circuit only part of the time, produces as a net effect the desired regulation. Thus if the voltage on the alternating-current mains of the generator rises above normal the solenoid 19 causes the contacts 14 to be brought into temporarily-longer engagement with the contact 13. This causes the magnet 22 to be deënergized, and thereby opens a shunt-circuit about the resistance 27 and includes the latter in circuit with the field of the booster 9. The booster voltage, which in this case is supposed to be added to that of the exciter source, is then reduced. This reduction of voltage is immediately felt by the controlling-solenoid 18, whereupon the contact 13, controlled thereby, recedes from the lower contact 14, thus opening the circuit of the magnet 22, which had just been closed. This opening of the circuit in response to the field exciting voltage takes place more promptly than would be the case if the apparatus were constructed so as to open the contacts only after the alternating voltage of the machine had been reduced and the weakening effect thereof transmitted to the solenoid 19. This promptness of action of the regulator prevents the surging or hunting of the voltage of the machine which would otherwise take place. The voltage having been thus adjusted, the contacts continue to vibrate regularly until some change of voltage occurs requiring correction, whereupon an action takes place similar to that already described.

The generator 3 (represented at the right-hand side of the drawing) is shown as having a separate consumption-circuit, as may be desirable in many instances. In this case it requires a system of regulation separate from that of the generator 2, and such a system, the same in construction as that used in connection with the regulator 2, is indicated in the drawing. Since the elements of this regulating system are the same as those in the system just described, no necessity exists for a description thereof in detail. It will be evident, however, that by the use of a system of regulation of its own the generator 3 may be controlled independently of the generator 2. It is furthermore evident that the two generators may, as indicated, receive their exciting-current from the same exciting source 1 and yet be independently regulable. If it is desired, however, to run the generators 2 and 3 in multiple, then one regulating system only is required and the other may be omitted.

It is evident from the foregoing description that various modifications in the embodiments of my invention may be made without departing from the spirit thereof, for which reason I do not wish to be limited to the exact details shown and described.

What I claim as new, and desire to secure by Letters Patent of the United States, is—

1. The combination of an alternating-current generator having alternating-current mains leading therefrom, and having a direct-current exciting-circuit connected thereto, a source of exciting-current connected to said exciting-circuit, a booster interposed in the exciting-circuit, and a regulator for said booster responsive both to the voltage of the alternating-current mains and to the resultant voltage of said exciting-source and booster.

2. The combination of a plurality of alternating-current generators, a common source of exciting-current, and a booster or regulating source of voltage interposed between said source and each of said generators.

3. The combination of a dynamo-electric machine having two relatively rotatable members, one of which is connected to an alternating-circuit and the other to a direct-current circuit, a voltage-generating device in circuit with said direct-current circuit, and a winding on said device responsive both to the voltage of the alternating-current mains and to the resultant voltage of said direct current circuit.

4. The combination of a plurality of alternating-current dynamo-electric machines, a common source of exciting-current, and a regulating source of voltage interposed between the source of exciting-current and one or more of said machines.

In witness whereof I have hereunto set my hand this 29th day of June, 1904.

WILLIAM L. R. EMMET.

Witnesses:
  BENJAMIN B. HULL,
  HELEN ORFORD.